United States Patent
Kobayashi et al.

(10) Patent No.: US 6,835,005 B2
(45) Date of Patent: Dec. 28, 2004

(54) METHOD FOR FUSION SPLICING OPTICAL FIBERS

(75) Inventors: Mikio Kobayashi, Kanagawa (JP);
Hiroshi Ohzeki, Kanagawa (JP);
Kimiyuki Tominaga, Fukuoka (JP);
Hidemitsu Hisata, Fukuoka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 195 days.

(21) Appl. No.: 10/195,378

(22) Filed: Jul. 16, 2002

(65) Prior Publication Data

US 2004/0013373 A1 Jan. 22, 2004

(51) Int. Cl.$^7$ ............................................ G02B 6/255
(52) U.S. Cl. ............................ 385/96; 385/97; 385/98; 385/99; 156/158; 156/159
(58) Field of Search ........................... 385/96, 97, 98, 385/99; 156/158, 159

(56) References Cited

U.S. PATENT DOCUMENTS 5,695,540 A    12/1997    Suganuma et al.

FOREIGN PATENT DOCUMENTS

| EP | 0 326 988 A | 8/1989 |
|----|-------------|--------|
| EP | 0 740 172 A1 | 10/1996 |
| EP | 1 014 070 A | 6/2000 |
| JP | 61-143704 | 7/1986 |
| JP | 7-248426 | 9/1995 |
| JP | 9-138318 | 5/1997 |
| WO | WO 91/03751 | 3/1991 |

*Primary Examiner*—Dean A. Reichard
*Assistant Examiner*—Jinhee Lee
(74) *Attorney, Agent, or Firm*—McDermott Will & Emery LLP

(57) ABSTRACT

In a method for fusing splicing optical fibers having different diameters of fiber coating portions, the fiber coating portions of optical fibers to be spliced are clamped on V-groove boards and end faces of the optical fibers are aligned. Then, the end faces of the optical fibers are fused spliced by a discharged heating. An inclination angle θg of glass fibers of the fusion spliced optical fibers is measured from an observed image of a fusion splicing portion after fusion splicing the optical fibers to estimate a splice loss of the optical fibers.

6 Claims, 4 Drawing Sheets

METHOD FOR FUSION SPLICING OPTICAL FIBERS

BACKGROUND OF THE INVENTION

1. Field of the Invention

The present invention relates to a method for fusion splicing the optical fibers. More particularly, the present invention relates to a method for fusion splicing the optical fibers with one fiber coating of a large thickness.

2. Description of the Related Art

A related-art method for fusion splicing the optical fibers of the same kind is known. In such a fusion splicing method, after the end faces of the optical fibers are fused together by discharge heating and butt jointed together, the optical fibers are subjected to additional discharge heating and pull-back (e.g., refer to Japanese Patent Unexamined Publication No. Hei. 7-248426, Japanese Patent Unexamined Publication No. Sho. 61-143704, etc.). FIGS. 5A–5D are views schematically showing the method for fusion splicing the optical fibers. Reference numeral 1 denotes a glass fiber, 2 denotes a core portion of optical fiber, and 3 denotes a micro bend.

FIG. 5A is a view showing a state where the core portions 2 of a pair of optical fibers 1 to be spliced are matched and aligned with a predetermined end face spacing. In this state, the discharge heating is performed to fuse the end portions of optical fibers, and then the ends of optical fibers are butt jointed together, as shown in FIG. 5B. When the core portions 2 are aligned and fusion spliced, the outer diameters of optical fibers are not matched if the core portions are eccentric, whereby the optical fibers are fused together in an offset state. Usually, the additional discharge heating is performed to modify this offset. By this additional discharge heating, the self-alignment action occurs owing to a surface tension of glass, so that the outer diameter portions of optical fibers are modified to be smoothly continuous. It has been found that the splice loss is improved by this additional discharge heating.

FIG. 5C is a view showing a state of optical fibers after the additional discharge heating. As a result of the outer diameters of optical fibers modified at the fused portion, a micro bend 3 is produced in the core portion 2. This micro bend 3 increases the splice loss, whereby the optical fibers butt jointed together at the time of fusion splicing are pulled back. FIG. 5D is a view showing a state after pulling back the optical fibers, in which the microbend 3 in the core portion is stretched into approximately linear form. Thereby, the splice loss can be further improved.

In fusion splicing the submarine optical fiber cables, to increase the splice strength of optical fiber, an fiber coating portion of optical fiber at the time of fusion splicing is clamped on a V-groove board (e.g., refer to Japanese Patent Unexamined Publication No. Hei. 6-118251). Further, to reduce a misalignment of the core portions of the optical fibers that is likely to occur by cantilever support, it is required to make the length (cleave length) of a glass fiber portion exposed in the fusion spliced portion as short as possible.

FIG. 6 is a view showing the clamp method. In the same figure, reference numeral 1 denotes a coated optical fiber, 4 denotes a glass fiber, 5 denotes a fiber coating, 6 denotes an axial clamp, and 7 denotes a V-groove board clamp. The axial clamp 6 clamps the coated optical fiber 1 and drives it in the axial direction to adjust the end face distance, and butt and pull back the optical fibers. The V-groove board clamp 7 is in a free state relative to the axial movement of the coated optical fiber 1, and holds the top end portion of the fiber coating 5 that is located near the glass fiber 4 having the coating removed. The V-groove board clamps 7 drive one glass fiber 4 of one coated optical fiber 1 in the X-axis direction, and the other glass fiber 4 of the other coated optical fiber 1 in the Y-axis direction to make alignment of the core portions of the optical fibers.

The fusion splicing method of FIGS. 5A–5D and the clamp method of FIG. 6 as shown in the related art are the case where the optical fiber outer diameters, the core portion diameters and the fiber coating diameters are the same or substantially same. In this case, the splice loss in fusion splicing has typically a predetermined correlation between the estimated loss and the actual measured loss. The estimated loss can be obtained by measuring the misalignment of the core portion in the splicing portion and the inclination of the core portion in the splicing portion, and the splice loss is calculated from this estimated loss.

However, when the optical fibers are fusion spliced, at least one of optical fibers having a fiber coating of large diameter, by the clamp method of FIG. 6, it has been found that there is no correlation between the estimated loss and the actual measured loss. For example, there is a case where an optical fiber having and a glass fiber diameter of 125 $\mu$m and a fiber coating outer diameter of 0.4 mm in which the effective core cross section is expanded for use in the wavelength division multiplexing transmission with the submarine optical fiber cable, is fusion spliced with a dispersion shift fiber for hermetic seal having a glass fiber diameter of 125 $\mu$m, with the surface coated with polyimide, and a fiber coating outer diameter of 0.25 mm, wherein each optical fiber is cleaved to have the length of glass fiber of about 3 mm. In this case, comparing the estimated loss and the actual measured loss using the clamp method in the above fusion splicing method, there is no correlation and a fully random relationship.

This may be caused by a plurality of factors, including a difference in the outer diameter between the optical fiber coatings and a bending dependency of optical fiber, but its detailed reason is not clear. Also, the splice loss is reduced by performing the additional discharge heating and pull-back. However, it has been found that there is no full correlation between the estimated loss and the actual measured loss in the related-art estimation method. However, in a submarine optical fiber cable system, for example, the estimated loss is employed in the case where the splice loss is practically difficult to measure.

SUMMARY OF THE INVENTION

The present invention has been achieved in the light of the above-mentioned problems. It is an object of the invention to provide a method for fusion splicing the optical fibers with a low splice loss and a high strength in which the actual splice loss can be estimated from the estimated loss in the case where optical fibers with one fiber coating of a large diameter are fusion spliced in short cleave length.

According to the present invention, there is provided a method for fusion splicing the optical fibers, comprising; aligning cores of the optical fibers to be spliced; fusing ends of the optical fibers together with their respective cores in alignment to splice; and measuring an inclination angle of the fusion-spliced optical fibers with reference to the optical fibers with their respective cores in alignment before fusing to estimate a splice loss.

DETAILED DESCRIPTION OF THE INVENTION

Figure 1A:
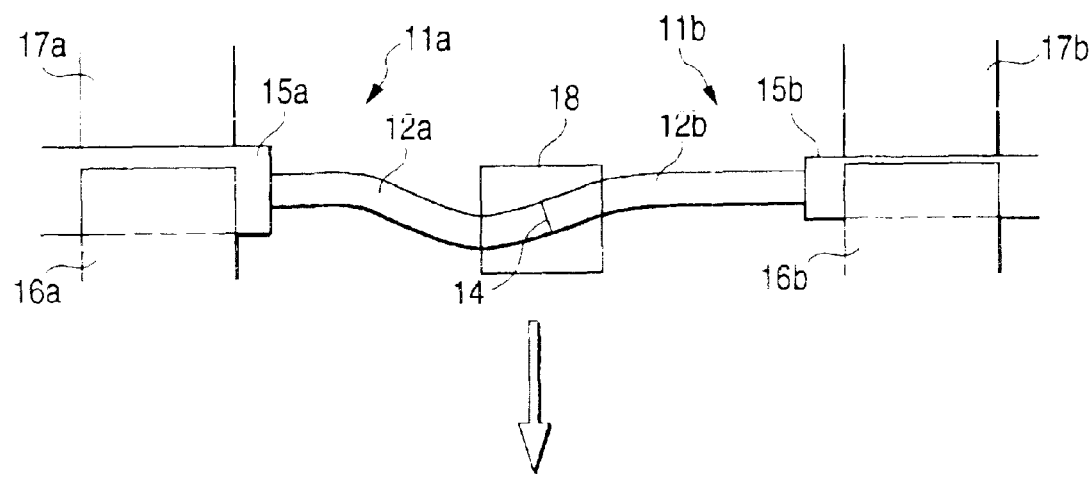
FIGS. 1A and 1B are views showing a state where the optical fibers are fusion spliced according to the present invention.
Figure 1B:
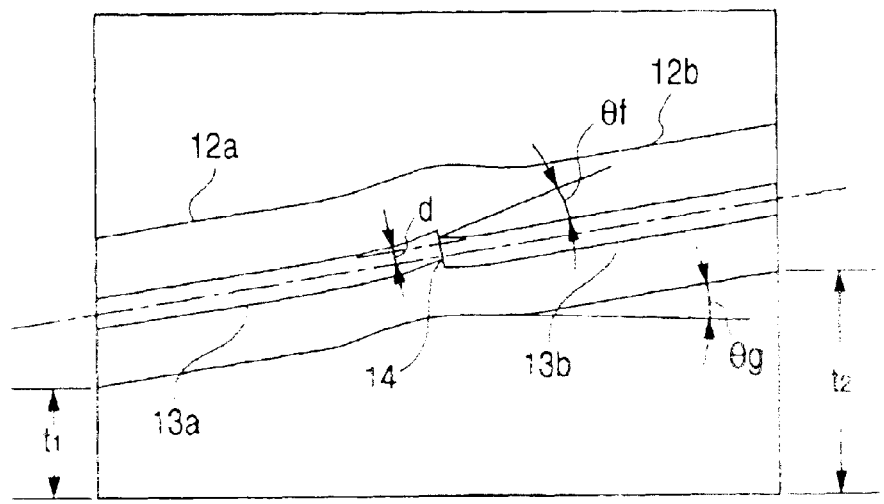

The preferred embodiments of the present invention will be described below with reference to the accompanying drawings. FIGS. 1A and 1B are views showing a state where the optical fibers are fusion spliced. FIG. 1A is a state view of fusion spliced optical fibers and FIG. 1B is an enlarged view of an image pickup screen of the fusion spliced portion of optical fibers. In FIGS. 1A and 1B, reference numerals 11a and 11b denote a coated optical fiber (hereinafter simply referred as an optical fiber), 12a and 12b denote a glass fiber, 13a and 13b denote a core portion, 14 denotes a fusion spliced portion, 15a and 15b denote a fiber coating. Further, 16a and 16b denote a V-groove board, 17a and 17b denote a pressure clamp, and 18 denotes the image pickup screen of the fusion spliced portion of optical fibers.

The optical fiber 11a to the left includes the glass fiber 12a having a nominal outer diameter of 125 μm on which the coating 15a (UV resin) having an outer diameter of 0.4 mm is applied. The optical fiber 11b to the right includes the glass fiber 12b having a nominal outer diameter of 125 μm on which the coating 15b (UV resin) having an outer diameter of 0.25 mm is applied. The left and right optical fibers 11a and 11b are placed with the end portions of fiber coatings 15a and 15b on the V-groove boards 16a and 16b, and clamped by the pressure clamps 17a and 17b to be movable in the axial direction.

The optical fibers are fusion spliced by fusing the glass fiber ends by discharge heating, and butt joining the fiber ends together in the same manner as described in the prior art and as shown in FIGS. 5A–5D. Thereafter, the optical fibers are subjected to additional discharge heating and pull-back, as needed. At the fusion spliced portion 14, a micro bend occurs due to butt joining the optical fibers together. This micro bend is straightened to some extent by pulling back the optical fibers after additional discharge heating.

The details of the fusion spliced portion 14 will be described below through the image pickup screen 18 in which an image is picked up by image observation means attached to a fusion splicing apparatus. The optical glass fibers 12a and 12b has a misalignment d between the core portions 13a and 13b at the fusion spliced ends, and a splicing angle offset θf. That is, d is an offset distance between the core axis of the core portion 13a and the core axis of the core portion 13b, and θf is an angle of the top portion of the core portion 13a with respect to the core axis of the core portion 13a. In related art, the splice loss between the optical fibers of the same kind is estimated by measuring the misalignment d and the splicing angle offset θf and calculating the estimated loss "α=F(d,θf)". This estimated loss α has a predetermined correlation with the actual measured loss, and can be used for the estimation of splice loss without any specific problems. In this case, the estimated loss has a large percentage by the misalignment d and a small percentage by the splicing angle deviation θf.

If the fiber coatings 15a and 15b for the optical fibers 11a and 11b to be spliced as shown in FIG. 1A have different diameters, the estimated loss α calculated from the misalignment d between the core portions 13a and 13b and the splicing angle deviation θf has no correlation with the actual measured loss and cannot be employed, as described in the related art. However, in a case of the submarine optical fiber cable system, it is often difficult to measure the splice loss, whereby the splice loss is calculated by estimation.

The present invention has been achieved by noting that the image of the glass fibers 12a and 12b before fusion splicing is placed in a horizontal state and the image of the glass fibers 12a and 12b after fusion splicing is placed in an inclined state, as viewed through the image pickup screen 18 for observing the splicing portion 14 of optical fibers. That is, the present invention has been achieved by noting a relative inclination angle θg of the glass fibers 12a and 12b after fusing splicing with reference to the glass fibers 12a and 12b with their respective core portions in alignment before fusion splicing. As a result of various verifications, it was revealed that there was a correlation between the inclination angle θg of the glass fibers 12a and 12b themselves on the image pickup screen and the splice loss, rather than the splicing angle deviation θf between the core portions 13a and 13b, in the case where the optical fibers of dissimilar diameters, with one fiber coating having a larger diameter, are fusion spliced, as shown in FIG. 1A. In this embodiment as shown in FIG. 1A, the image observation means is positioned so that the image of the glass fibers 12a and 12b before fusion splicing is placed in a horizontal state as viewed through the image pickup screen 18. However, the position of the image observation means is not limited to this embodiment. In the case where the image observation means is positioned so that the image of the glass fibers 12a and 12b is not placed in the horizontal state as viewed through the image pickup screen 18, the inclination angle θg of the glass fibers 12a and 12b themselves before and after fusing splicing is a relative inclination angle of the image of glass fibers 12a and 12b after fusion splicing with reference to the image of glass fibers 12a and 12b before fusion splicing.

The image pickup screen 18 picks up an image of only a vicinity of the fusion splicing portion 14 of optical fibers to be fiber spliced, in which the image is displayed substantially linearly in a form of representing a bent state at the splicing portion of the spliced optical fibers. The inclination angle θg can be easily measured from the addresses $t_1$ and $t_2$ at both ends of the image pickup screen.

In FIG. 1B, the inclination angle θg is measured from one image pickup screen 18. However, the inclination angle θg may be a vector synthesized angle of measured angles from orthogonal two-axis directions perpendicular to the core axis direction of the glass fibers using orthogonal two-axis direction image observation means.

A specific example of the invention is presented below. The optical fiber 11a to the left in FIG. 1A had a glass fiber diameter of 125 μm and an outer diameter of fiber coating of 0.4 mm in which the effective core cross section was expanded for use in the wavelength division multiplexing transmission with the submarine optical fiber cable. The optical fiber 11b to the right was a dispersion shift fiber for hermetic seal having a glass fiber diameter of 125 μm, with the surface coated with polyimide (coating thickness of 5 μm), and an outer diameter of fiber coating of 0.25 mm.

The splicing ends of the optical fibers 11a and 11b were cleaved so that the glass fibers 12a and 12b are exposed by a length of 3 mm from the fiber coatings 15a and 15b, respectively. The optical fiber 11b, when set in the fusion splicing apparatus, had the polyimide coatings removed by a length of 1.5 mm from the top end by intermittent discharge employing a discharge electrode of the apparatus, so that the glass fiber surface was exposed.

Figure 6:
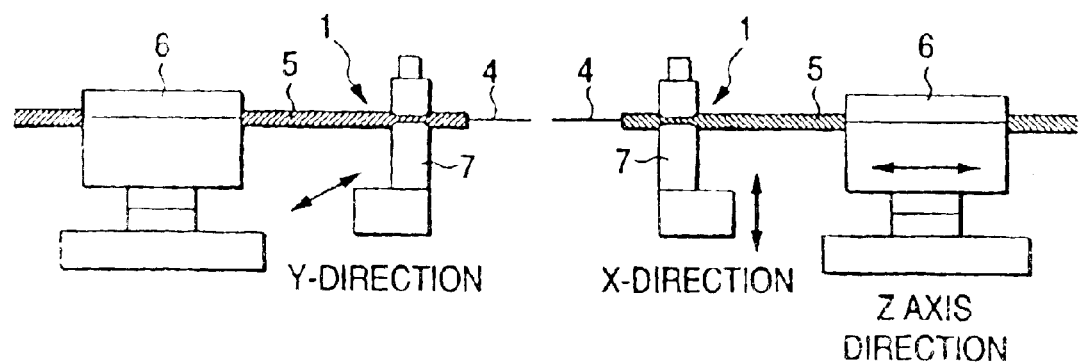
FIG. 6 is a view for explaining a clamp method for the related-art fusion splicing.

The optical fibers 11a and 11b are fixed, using the clamp method as shown in FIG. 6. That is, the fiber coatings 15a and 15b of the optical fibers are clamped and fixed by the axial clamps 6, and clamped on the V-groove boards 7 so that the optical fibers are made movable in the X direction. The adjustment of spacing between glass fiber end faces is made by driving the axial clamp 6. The alignment of the glass fiber end face is made by driving one of the V-groove boards 7 in the X direction (vertical direction in drawing) and the other in the Y direction (forth and back direction in drawing).

Figure 2:
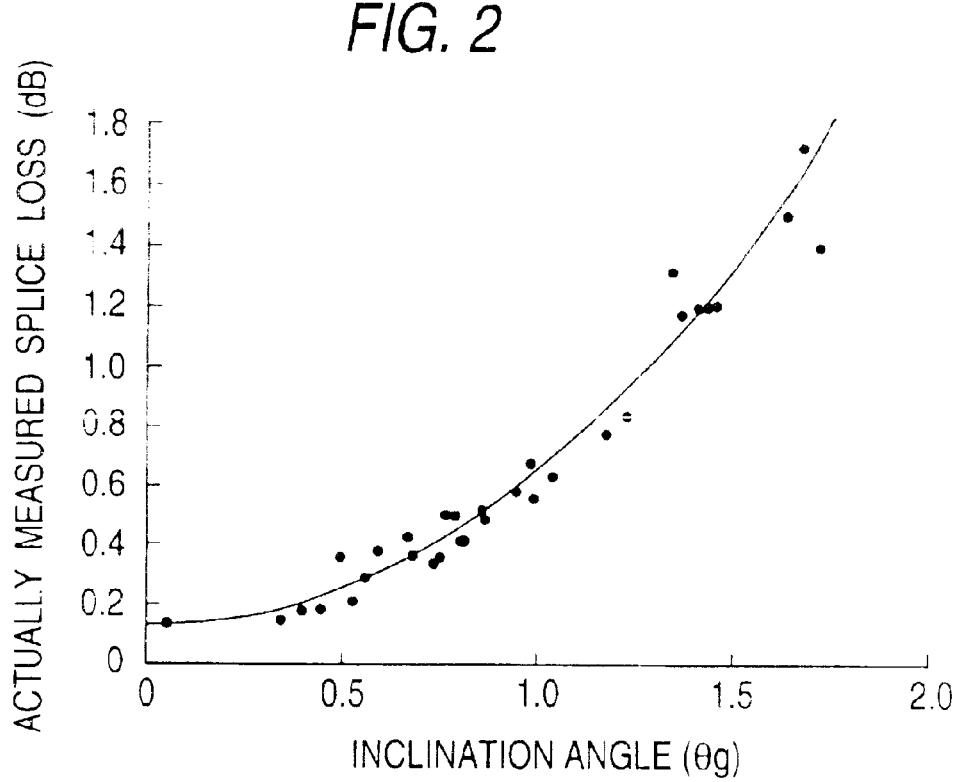
FIG. 2 is a graph representing the relationship between fiber inclination angle and splice loss in a specific example of the invention.

FIG. 2 is a graph showing the relationship between the inclination angle θg (a vector synthesized angle of measured angles from orthogonal two-axis directions) as shown in FIG. 1B and the actually measured splice loss by fusion splicing the optical fibers using the clamp method. In FIG. 2, the additional discharge heating and pull-back after fusion splicing are not performed. On the contrary, FIG. 3 is a graph showing the relationship between the inclination angle θg and the splice loss by performing the additional discharge heating after actually measuring the inclination angle and the splice loss of FIG. 2.

Figure 3:
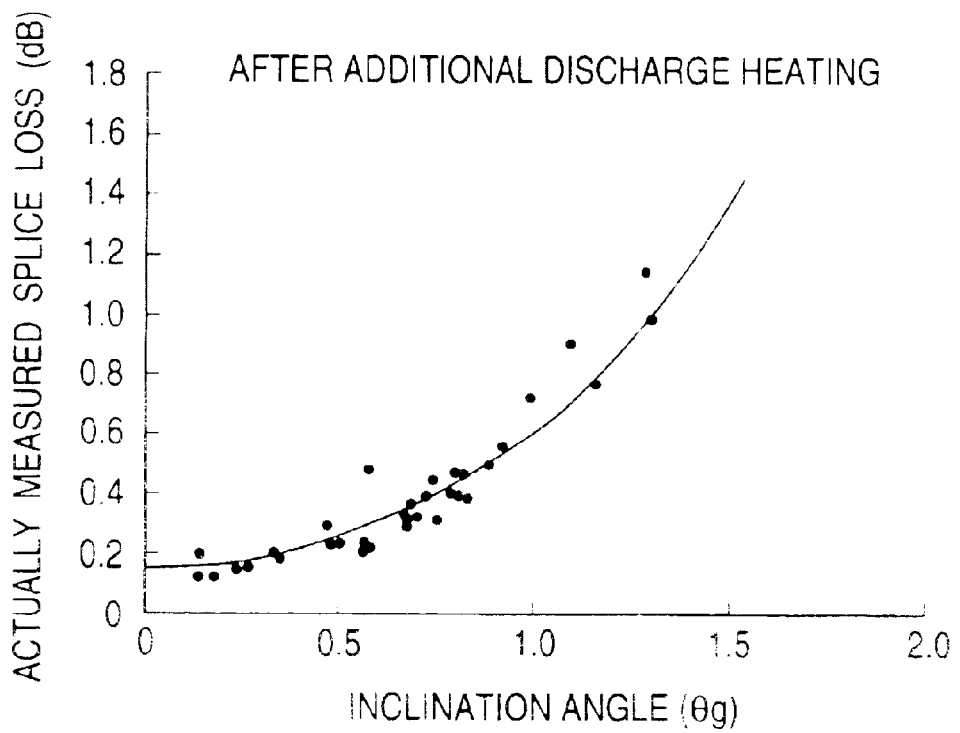
FIG. 3 is a graph representing the relationship between fiber inclination angle and splice loss after additional discharge in a specific example of the invention.

According to FIGS. 2 and 3, it was found that there was a correlation between the inclination angle θg and the splice loss actually measured. Further, it can be confirmed that the splice loss is improved by performing the additional discharge heating or the additional discharge heating and pull-back after fusion splicing. From these results, the estimated loss $\alpha = F(\theta g)$ is calculated by measuring the inclination angle θg and formulating this as a variable, and can be employed as the splice loss.

Table 1 shows the improved states of the splice loss by the additional discharge heating and pull-back in fusion splicing the optical fibers of dissimilar diameters in which one fiber coating has a larger diameter.

TABLE 1

Number of samples 30

| | Splice loss (dB) | | | |
|---|---|---|---|---|
| | Average | Maximum | Minimum | Yield n (%) |
| Discharge heating | 0.64 | 1.71 | 0.13 | 43 |
| Additional discharge | 0.32 | 1.10 | 0.12 | 87 |
| Additional discharge + pull-back | 0.27 | 0.44 | 0.09 | 100 |

As will be apparent from Table 1, the splice loss is large when fusion splicing the optical fibers by the discharge heating alone, so that the yield is unexcellent. By performing the additional discharge, the splice loss can be significantly improved, and the yield can be improved almost twice better than that when no additional discharge is performed. By performing the pull-back besides the additional discharge heating, the splice loss can be further improved, especially when the optical fibers having the large splice loss are spliced, and the yield can be made at about 100%.

Figure 4:
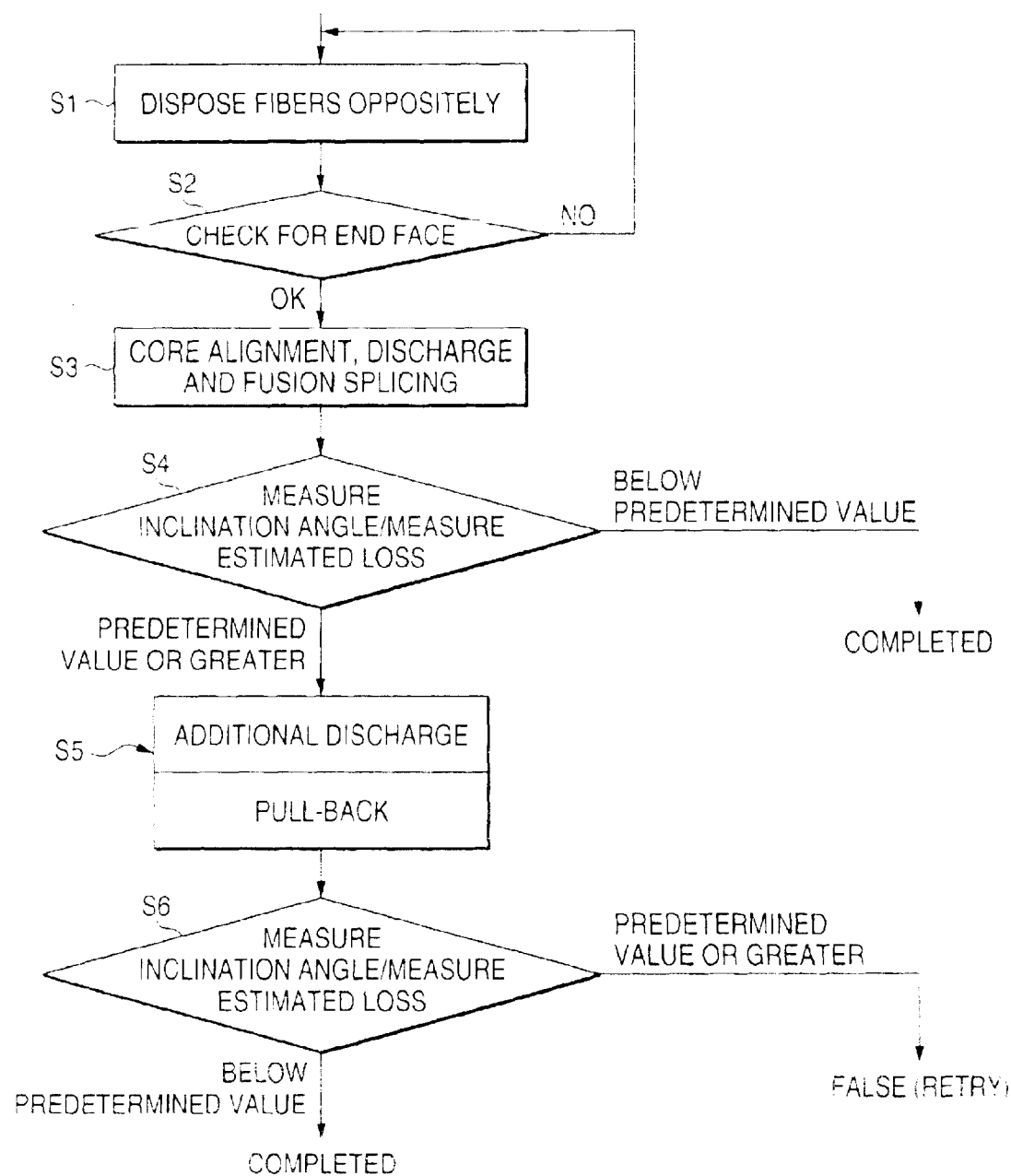
FIG. 4 is a flowchart showing a fusion splicing method of the invention.
Figure 5A:
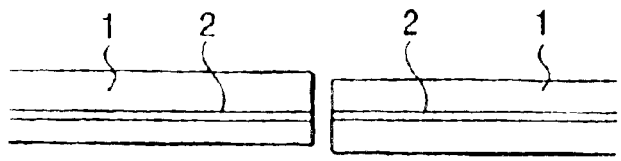
FIGS. 5A–5D are views for explaining the related-art fusion splicing forms.
Figure 5B:
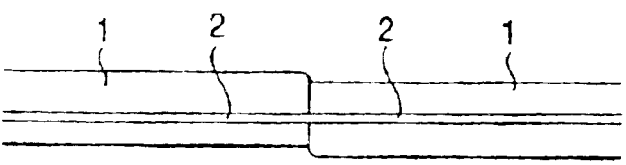
Figure 5C:
Figure 5D:
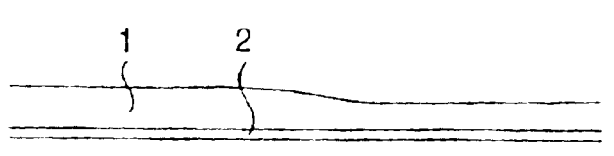

Referring to a flowchart of FIG. 4, the fusion splicing method of the invention will be described below. First of all, at step S1, the optical fibers are set on the fusion splicing apparatus and have the glass fiber ends disposed oppositely by the well-known method as shown in FIG. 6. Then, at step S2, the end face of glass fiber is checked to determine whether or not there is the dust and the cleave condition is excellent. If the answer is NO, the check is retried, or otherwise the procedure goes to step S3.

At step S3, the discharge heating is performed under the predetermined fusion splicing conditions, the glass fiber ends are butt jointed together. At step S4, the inclination angle of glass fiber is measured, and the estimated loss is calculated based on this inclination angle. If this estimated loss is below a predetermined value, the fusion splicing is ended. On the contrary, if the estimated loss is greater than or equal to the predetermined value, the procedure goes to step S5. At step S5, the additional discharge heating or the additional discharge heating and pull-back are performed. Thereafter, at step S6, the inclination angle is measured again, in which if the estimated loss is below a predetermined value, the procedure is ended, or otherwise the splicing is false, whereby the procedure returns to the initial state and retried.

The present invention is not limited to the above embodiments, but may be applied to, besides the optical fibers having the coating of equal diameter and a combination of optical fibers having the outer diameters of 0.4 mm and 0.25 mm, the optical fibers having the dependency between the inclination angle of glass fiber and the splice loss.

As will be apparent from the above description, with the present invention, the splice loss infusion splicing the optical fibers, at least one fiber coating having a larger diameter, can be obtained by measuring an inclination angle of the glass fibers in the optical fibers and calculating the estimated loss. Further, if the estimated loss is greater than or equal to a predetermined value, the additional discharge heating and the pull-back are automatically performed, whereby the splice loss can be improved. Moreover, the degraded splicing strength is avoided because the optical fibers are spliced by clamping the coatings.

What is claimed is:

1. A method for fusion splicing the optical fibers, said method comprising;

aligning cores of the optical fibers to be spliced;

fusing ends of the optical fibers together with their respective cores in alignment to splice; and measuring an inclination angle of the fusion-spliced optical fibers with reference to the optical fibers with their respective cores in alignment before fusing to estimate a splice loss.

2. The method for fusion splicing the optical fibers according to claim 1, further comprising:

performing an additional discharge heating to the fusion spliced optical fibers, wherein the splice loss is estimated for the optical fibers subjected to the additional discharge heating.

3. The method for fusion splicing the optical fibers according to claim 2, further comprising:

pulling back the optical fibers subjected to the additional discharge heating, wherein the splice loss is estimated for the optical fibers subjected to the additional discharge heating and the pull-back.

4. The method for fusion splicing the optical fibers according to of claim 1, wherein fiber coating diameters of the optical fibers to be fusion spliced are different from each other.

5. The method for fusion splicing the optical fibers according to of claim 1, wherein one of the optical fibers to be fusion spliced includes a glass fiber having a nominal outer diameter of 125 μm and an fiber coating having an outer diameter of 0.4 mm covered on the glass fiber, and the other optical fiber includes a glass fiber having a nominal outer diameter of 125 μm and an fiber coating having an outer diameter of 0.25 mm covered on the glass fiber.

6. The method for fusion splicing the optical fibers according to claim 1, wherein the inclination angle is an inclination angle of glass fibers of the fusion spliced optical fibers with reference to a core axis of glass fibers of the optical fibers with their respective cores in alignment before fusing.

* * * * *